United States Patent
Trabucco

(10) Patent No.: US 11,816,324 B2
(45) Date of Patent: Nov. 14, 2023

(54) METHOD AND SYSTEM FOR SETTING A VALUE FOR A PARAMETER IN A VEHICLE CONTROL SYSTEM

(71) Applicant: Volkswagen Aktiengesellschaft, Wolfsburg (DE)

(72) Inventor: Luigi Trabucco, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/292,405

(22) PCT Filed: Nov. 29, 2019

(86) PCT No.: PCT/EP2019/083035
§ 371 (c)(1),
(2) Date: Oct. 5, 2021

(87) PCT Pub. No.: WO2020/126410
PCT Pub. Date: Jun. 25, 2020

(65) Prior Publication Data
US 2022/0147233 A1    May 12, 2022

(30) Foreign Application Priority Data
Dec. 18, 2018   (DE) .......................... 102018222124.3

(51) Int. Cl.
*G06F 3/01*     (2006.01)
*G06F 3/04847*  (2022.01)

(52) U.S. Cl.
CPC .......... *G06F 3/04847* (2013.01); *G06F 3/017* (2013.01)

(58) Field of Classification Search
None
See application file for complete search history.

(56) References Cited

U.S. PATENT DOCUMENTS 9,626,198 B2    4/2017 Hess
2008/0141181 A1*  6/2008 Ishigaki .............. G06F 3/04847
                                                   715/863

(Continued)

FOREIGN PATENT DOCUMENTS

CN    104781127 A    7/2015
DE    102005047650 A1    4/2007

(Continued)

OTHER PUBLICATIONS

WO2014026854A1 by Soenke et. al (English machine translations) (published on Feb. 20, 2014).*

(Continued)

*Primary Examiner* — Rinna Yi
(74) *Attorney, Agent, or Firm* — Peter Zura; LOZA & LOZA, LLP

(57) ABSTRACT

Technologies and techniques for setting a value for a parameter in which a graphical user interface is generated and output, wherein the graphical user interface includes a selection object that is assigned to the parameter. A first user input, which includes a positioning gesture related to the selection object, is captured, wherein a setting object is generated depending on the first user input and is positioned on the graphical user interface according to the positioning gesture. A second user input, which includes a setting gesture, is captured, with the value of the parameter being set using the setting object according to the setting gesture.

17 Claims, 8 Drawing Sheets

(56) References Cited

U.S. PATENT DOCUMENTS

| | | | |
|---|---|---|---|
| 2011/0107216 A1* | 5/2011 | Bi | G06F 3/0481 |
| | | | 715/863 |
| 2013/0145360 A1 | 6/2013 | Ricci | |
| 2014/0026093 A1* | 1/2014 | Picard | G06F 3/04847 |
| | | | 715/781 |
| 2014/0043367 A1* | 2/2014 | Sakaino | G06T 11/60 |
| | | | 345/647 |
| 2014/0096003 A1 | 4/2014 | Vu et al. | |
| 2014/0229897 A1* | 8/2014 | Agrawal | G06F 3/04855 |
| | | | 715/833 |

FOREIGN PATENT DOCUMENTS

| | | | |
|---|---|---|---|
| DE | 102012016113 A1 | 2/2014 | |
| DE | 102014211349 A1 | 12/2015 | |
| WO | 2004091956 A2 | 10/2004 | |
| WO | 2014026854 A1 | 2/2014 | |
| WO | 2014056838 A1 | 4/2014 | |

OTHER PUBLICATIONS

PCT/EP2019/083035. International Search Report. (dated Feb. 19, 2020).

* cited by examiner

METHOD AND SYSTEM FOR SETTING A VALUE FOR A PARAMETER IN A VEHICLE CONTROL SYSTEM

RELATED APPLICATIONS

The present application claims priority to International Pat. App. No. PCT/EP2019/083035 to Luigi Trabucco, filed Nov. 29, 2019, titled "Method and System for Setting a Value for a Parameter", which claims priority to German Pat. App. No. 102018222124.3, filed Dec. 18, 2018, the contents of each being incorporated by reference in their entirety herein.

FIELD OF TECHNOLOGY

The present disclosure relates to a method for setting a value for a parameter. It also relates to a system for setting a value for a parameter, in particular in a vehicle.

BACKGROUND

The increasing distribution of electronic devices and controls, in particular in vehicles, makes user friendly concepts for detecting user inputs necessary. In particular, parameters for setting a wide range of applications must be detected. By way of example, a user in a vehicle can operate and set a climate control system, radio, and navigation system. One important trend is that user interfaces are displayed on increasingly larger screens. Various aspects must be considered with regard to their design, which can have a significant effect on safety and operating convenience. Guidelines have been provided, e.g. by the *Japan Automobile Manufacturers Association* (JAMA).

A user interface for an audio system in a vehicle is described in US 2014/096003 A1. The interior of the vehicle is displayed graphically, and the user can set an optimal audio setting by operating sliders.

WO 2004/091956 A2 describes configurable instrument panels using a tactile control for vehicles, wherein rises and recesses can be generated on a screen surface, including lines, with which a slider is implemented.

An input/output unit is described in WO 2014/056838 A1, in which a slider can be moved using a trigger pen to trigger functions in a vehicle.

WO 02/064488 A2 proposes an intelligent assistance system that has a modular structure, wherein sliders are used to set parameters.

SUMMARY

Aspects of the present disclosure is to create a method and a system for setting a value for a parameter, the operation of which is particularly suited to a user and safe.

In some examples, a graphical user interface is generated and output. This graphical user interface includes a selection object assigned to the parameter. A user input is detected that comprises a positioning gesture relating to the selection object, wherein a setting object is generated on the basis of the first user input, and positioned on the graphical user interface on the basis of the positioning gesture. A second user input is then detected that comprises a setting gesture, wherein the value for the parameter is set by means of the setting object on the basis of the setting gesture.

The user can advantageously freely position the setting element in this method, such that it is readily visible and operable. By way of example, a setting element far outside a driver's field of vision can be slid to a position where it can be more readily seen and operated. The method also has the advantage that the setting element only needs to be displayed when it is actually to be operated, such that the necessary space on a display surface is not permanently blocked. Moreover, the number of necessary operating steps is reduced, because a single gesture, for example, is already sufficient for retrieving and positioning the setting element, and this gesture can then transition directly to another gesture for setting a parameter value.

These gestures provide the user with a particularly simple and intuitive input means for setting parameters. A "gesture" as set forth in the present disclosure may include a specific positioning of an actuating object, such as a pen or user's finger, or a specific movement executed by the actuating object. The positioning and setting gestures may be familiar gestures. They may include, in particular, pointing, tapping, wiping, pulling or sliding gestures, or everyday gestures, such as handwaving, grabbing, and combinations of such gestures, which may be executed in quick succession.

The gestures are executed in a detection space that may include a spatial relation to a display range for the graphical user interface, and specifically borders thereon. In particular, the detection space is a detection surface on the graphical user interface, e.g., a touchscreen, which extends at least in part over the graphical user interface.

The detection of the user inputs, and in particular the gestures, takes place in the known manner, such as using a touchscreen. The touchscreen may include a display surface on which the graphical user interface can be output, and a touch-sensitive surface placed thereon, which detects where it has been touched, e.g., by means of capacitive or resistive measurements. Alternatively or additionally, a gesture or part of a gesture can be detected in a space in front of the graphical user interface, e.g., in that it is detected when an actuating object approaches the graphical user interface, or a region within the graphical user interface, or in that a specific direction of a pointing gesture toward a specific position on the display surface is detected. Other input devices can also be used for detecting the gesture, e.g., a touchpad, mouse, or joystick. The graphical user interface can also comprise a cursor, mouse pointer, or comparable position display object, the position of which can be controlled, such that a gesture can be input based on the movement thereof.

In some examples, a second user input is detected immediately after the first user input. As a result, the operation is advantageously particularly quick.

By way of example, the first and second user inputs can contain a continuous movement, e.g., in the form of a continuous wiping gesture. With this embodiment, the first and second user inputs are executed in particular by means of a movement along a touch-sensitive surface, wherein the user touches the surface with an actuating object, e.g., his finger, and executes the first and second user inputs without losing contact between the finger and the surface. By way of example, the finger is not lifted away from the surface before the second user input has been completed. In other examples, the first and/or second user input is not executed along a surface; here as well, the second user input can directly follow the first. In particular, no other user input is detected between the first and second user inputs.

In another embodiment, the first and second user inputs form a movement and the start of the second user input is detected after the movement is interrupted, in particular for a period of time exceeding a threshold, or after a change in the direction of the movement has been detected. The first and second user inputs can be advantageously particularly easily distinguished from one another as a result.

The first and second user inputs may be formed to a continuous movement. The positioning and/or setting gesture contains a movement in a specific direction. This can be determined by assessing a gestural sequence, e.g., by comparing the starting and ending positions of the gesture, or based on a trajectory along which an actuating object moves when the gesture is executed.

By way of example, the user touches a touch-sensitive surface at a first position, and moves along the surface to a second position, wherein the movement path is detected as the trajectory. This can be interpreted as a positioning gesture of the first user input. The user then moves to a third position without lifting his finger from the surface, wherein this movement is then interpreted as the setting gesture of the second user input.

To distinguish between the first and second user inputs, an interruption of the movement to the second position by the user can be detected, at which the position of the movement remains constant, or only changes slightly, for a specific time interval. If the time interval exceeds a threshold value, the subsequent further movement to the third position is then recognized as belonging to the second user input.

Alternatively or additionally, the direction of movement can be detected during the first user input. If the direction of movement changes and this change exceeds a threshold, this can be recognized as the transition to the second user input. The change can be determined, e.g., by deriving the speed over time. Furthermore, a change in the direction of movement can be detected when the movement is first predominantly horizontal and subsequently predominantly vertical.

Alternatively or additionally, a brief lifting of the actuating object from the surface can be detected, particularly for a period shorter than a threshold value, wherein a gesture prior to the lifting is recognized as the first user input, and a gesture following the lifting is recognized as the second user input. There can also be a threshold value for a distance between the end position of the first user input and the starting position of the second user input, wherein the threshold value cannot be exceeded if the user inputs are to be detected as successive.

Furthermore, two threshold values can be defined for interrupting contact: if the first contact is interrupted for a period of time that is shorter than the first threshold value, this interruption is ignored, and the continuation of the movement is regarded as uninterrupted. If the interruption lasts longer than the first threshold value but is shorter than the second threshold value, this is regarded as the transition from the first user input to the second user input. If the interruption is longer than the second threshold value, this is regarded as a termination of the operation after the first user input.

The graphical user interface in the present disclosure may include a selection object. This can take a number of forms, and comprises, in particular, a graphical object at a specific position or in a specific region on the user interface. The adjustable parameter is assigned to this selection object. It can be a button or a display, which is graphically designed such that a user can determine which parameter is assigned to the selection object, e.g., based on a labeling or a symbol.

By way of example, the selection object includes a surface, inside which the current value of the parameter is output, e.g., a temperature or intensity of a climate control system, the volume or other setting for media playback, or the scale of a map display.

Furthermore, the positioning gesture of the first user input relates to the selection object in the method. This means that the positioning gesture is executed such that a relation to the selection object can be detected. If the user interface comprises numerous selection objects, for example, the positioning gesture can be used to determine which selection object this first user input relates to. This relationship can be detected, e.g., in that the positioning gesture comprises selecting or touching the selection object, or approaching it. In particular, the positioning gesture can comprise a starting position that is detected in the region of the selection object.

The setting object is generated in the known manner, in particular in that the setting object is displayed on the graphical user interface. This can comprise an immediate appearance on the user interface, or it can be displayed in an animated form, e.g., in that the setting object becomes increasingly less transparent, increases in size, or describes a movement in which it appears from the side of the user interface.

In a further development of the method, the positioning gesture comprises a wiping gesture with a trajectory moving in particular from a starting position to a target position, and the setting object is slid along this trajectory. This advantageously results in a particularly intuitive operability.

The setting object can appear at the starting position for the gesture trajectory of the positioning gesture for this, and its position can follow the course of the trajectory of the gesture. In particular, the setting object is placed at the end of the positioning gesture at an end position of the gesture trajectory.

In some examples, the setting object comprises a slider with a scale and a control element, wherein the setting gesture comprises a sliding of the control element along the scale. The operation is advantageously based on the operation of an analog control element, while exploiting the advantage of the flexible display within the graphical user interface.

The setting object can be a slider displayed on the graphical user interface. Such a setting element can be actuated by a movement based on a gesture that corresponds to a pulling or pushing gesture in relation to the depiction of the setting object, wherein the resulting movement takes place when executing the setting gesture. In other exemplary embodiments, the setting element can be a rotary knob, in which case a rotating gesture can be interpreted as the setting gesture. The setting gesture corresponds to a movement that would be executed with corresponding mechanical operating elements, for example, such that the user can easily learn these gestures.

In another example, the value for the parameter that is set during the setting gesture is displayed alphanumerically. This makes it particularly easy to track and set the value.

The value that is set can be displayed on the graphical user interface at a position in relation to an actuating object, e.g., a finger. By way of example, the position where the actuating object touches the touch-sensitive screen can be detected and the value that is set can be displayed next to this position such that it is not hidden by the actuating object. The position at which the value that is set is displayed changes, in particular when the actuating object moves.

The display can be generated, e.g., next to or above the setting object, such as a slider. Furthermore, the value that is set can be displayed near the selection object. Alternatively, the parameter set prior to the operation thereof can be displayed near the selection object, while the newly set value can be displayed elsewhere, e.g., next to the slider that is operated; in particular, the updated value is first also displayed near the selection object after setting the new value for the parameter.

In some examples, the setting object may enlarged when it is positioned. This makes it easier to operate. Furthermore, the value for the parameter can be set more precisely when the setting object is enlarged.

By way of example, the setting object can first be generated with a starting size, for example, at the start of the first user input. The enlargement can then take place during the positioning gesture, e.g., based on, or in proportion to, the length of a movement detected in the gesture. The enlargement can also be based on a distance from a starting position to an end position of the positioning gesture. The enlargement can also be based on a position of the setting object, in particular along a specific axis in the user interface. By way of example, this user interface can have a horizontal axis and a vertical axis, and the enlargement can be based on the position along the vertical axis, thus becoming larger as the setting object is moved upward.

In another embodiment the setting object is slid upward on the user interface with the positioning gesture. Consequently, the setting object can then be advantageously placed where it is particularly visible.

The setting object is slid by the positioning gesture, for example, from a starting position in a lower part of the user interface to an upper part, and enlarged on the basis of its vertical position. The selection object is located for this in particular in the lower portion of the user interface, e.g., within the lower 25% of the user interface, preferably within the lower 10% of the user interface. Starting from the position of the selection object, the setting element is slid into the upper 25%, preferably the upper 10% of the user interface. Up and down, as well as horizontal and vertical, are defined in relation to an observer of the user interface, in particular in relation to a gravitational field in which the user interface is displayed on a screen.

Such a configuration may be advantageous in a vehicle, in which a display for the user interface is typically located such that the must look down from the road traffic to operate it. This movement should be kept to a minimum. The higher the setting object is in the user interface, the less the driver needs to change his viewing angle, and the quicker the operation can take place.

In some examples, the setting element is in the form of a slider with a scale and a control element, it can be configured to be of a smaller size at the start of the first user input, such that only the control element is visible. When it is slid, the setting element becomes larger, such that the length of the scale is increased, while the size of the control element remains the same.

The enlargement of the setting object takes place in particular in conjunction with an animated sequence, wherein intermediate images are generated and output such that a continuous transition from the different positions and/or sizes of the setting element is depicted.

In some examples, the end of the operation is detected and the setting object is faded out. As a result, the setting object does not take up any space on the graphical user interface if it is not needed.

The end of the operation is detected when an actuating object or finger is lifted from the touch-sensitive surface. The fade-out can be delayed and take place over a specific time interval, wherein the setting object is still displayed during this time interval and wherein the operation can be reinitiated within this time interval.

The system according to the disclosure, specified in the introduction, includes a control unit for generating a graphical user interface that has a selection object assigned to the parameter, an output unit for outputting the graphical user interface, and a detection unit for detecting a first and second user input. The first user input includes a positioning gesture relating to the selection object, and the second user input includes a setting gesture, wherein the control unit is configured to alter the graphical user interface based on the first user input, such that a setting object is generated and positioned on the graphical user interface based on the positioning gesture, and wherein the control unit is also configured to set the value for the parameter based on the setting gesture.

The system according to the present disclosure is designed in particular to implement the method according to the disclosure described herein. The system therefore has the same advantages as the method according to the present disclosure.

The output unit and the detection unit in the system can be integrated in a touchscreen, that may be configured as a display surface for displaying the graphical user interface. A touch-sensitive surface extends over the side of the display surface facing the observer, which can detect the location and also the duration as well as the change in location where the touchscreen is touched. The touch-sensitive surface can extend over a portion of the display surface.

In other embodiments of the system according to the disclosure there can also be another detection unit, e.g., a mouse, joystick, touchpad, or some other unit for detecting spatial gestures.

The vehicle according to the disclosure comprises a system as disclosed herein.

BRIEF DESCRIPTION OF THE DRAWINGS

The present disclosure is described based on exemplary embodiments in reference to the drawings. Therein.

DETAILED DESCRIPTION

Figure 1:
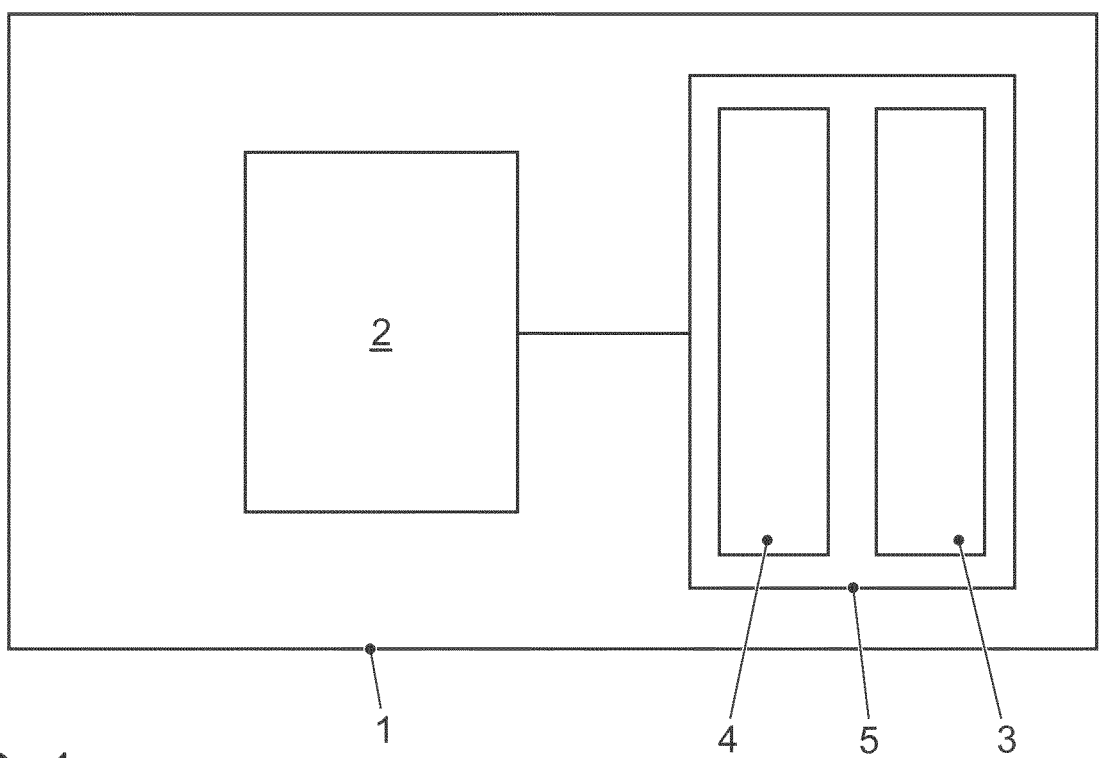
FIG. 1 shows a vehicle with an exemplary embodiment of the system according to aspects of the present disclosure.

A vehicle illustrating an exemplary embodiment of the system according to the disclosure is shown in reference to FIG. 1.

The vehicle 1 may include a control unit 2 that is coupled to a touchscreen 5. The touchscreen 5 includes a conventional output unit 3 and detection unit 4. The output unit 3 forms a display with a display surface on which a graphical user interface can be displayed. The detection unit 4 includes a touch-sensitive surface that extends in the form of a transparent layer over the display surface on the output unit 3, and can detect touch.

The screen in this example may be touched by a user's finger, and the current position where the screen has been touched is then detected. Furthermore, the length of the touch and any changes in its position are also detected.

In other examples, there is a proximity sensor, which can detect the approach of a finger or some other actuating object toward the touchscreen 5. The approach is also assigned a position on the display surface. In this manner, the actuating object can be located near the display surface, in the same way it would be located when the screen is actually touched.

Displays shall be explained in reference to FIGS. 2A to 2G that can be generated in an example of a method according to the present disclosure. This is based on examples of the system according to the present disclosure explained herein, which shall be further specified in the description of the method.

Figure 2A:
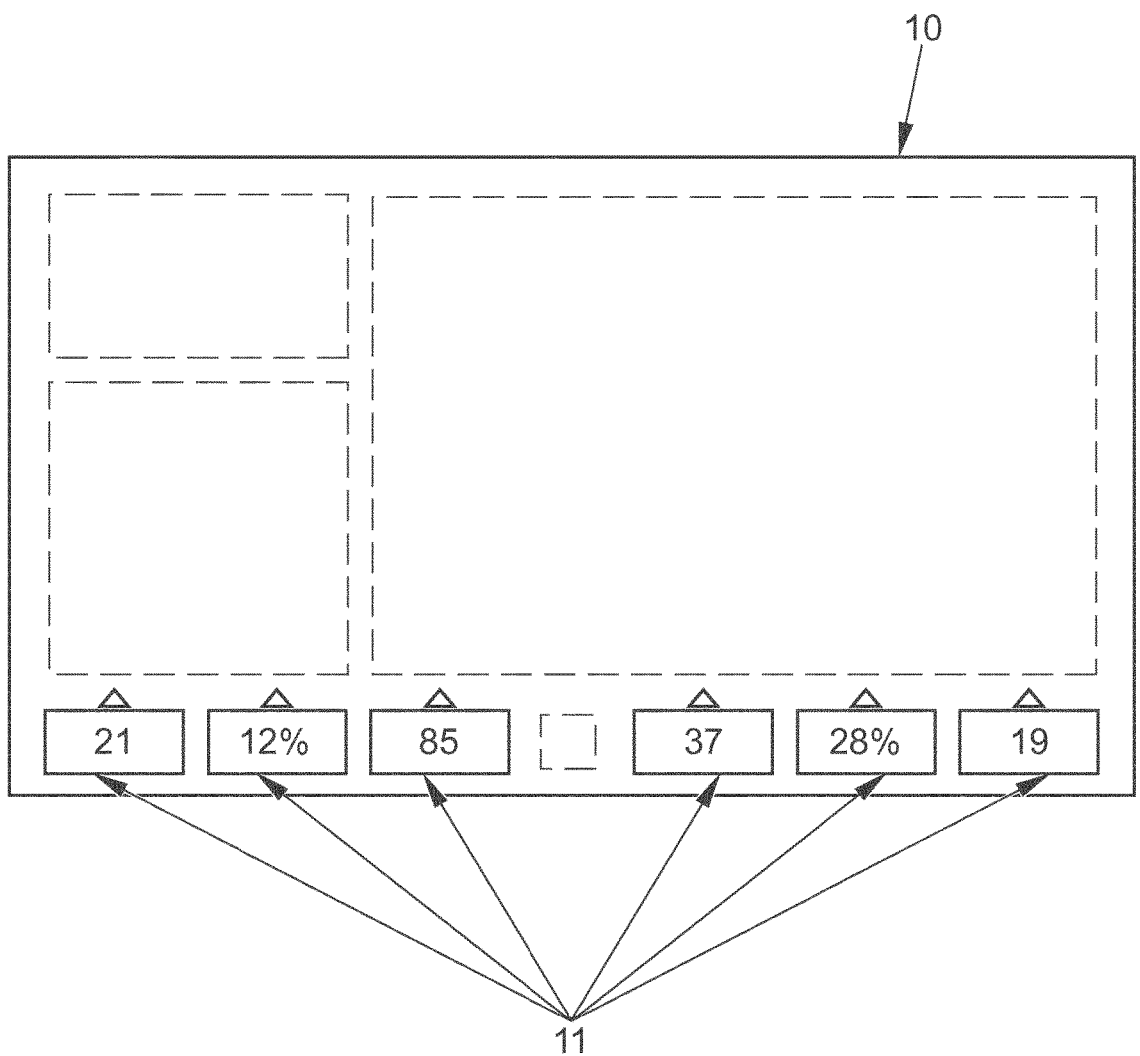
FIGS. 2A to 2G show displays that can be generated in an exemplary embodiment of the method according to aspects of the present disclosure.

FIG. 2A shows a graphical user interface output on a display surface 10. Rectangular selection objects 11 are arranged along the lower edge. Numerical values and percentages are also shown in the selection objects 11 in this exemplary embodiment, and there are also arrows pointing upward above the rectangular elements. The selection objects 11 are assigned to various parameters for a climate control in the vehicle 1, e.g., temperature, ventilation settings and directions for the left and right sides of the vehicle 1 in this exemplary embodiment. In other exemplary embodiments, values for other parameters of other devices can also be set.

Figure 2B:
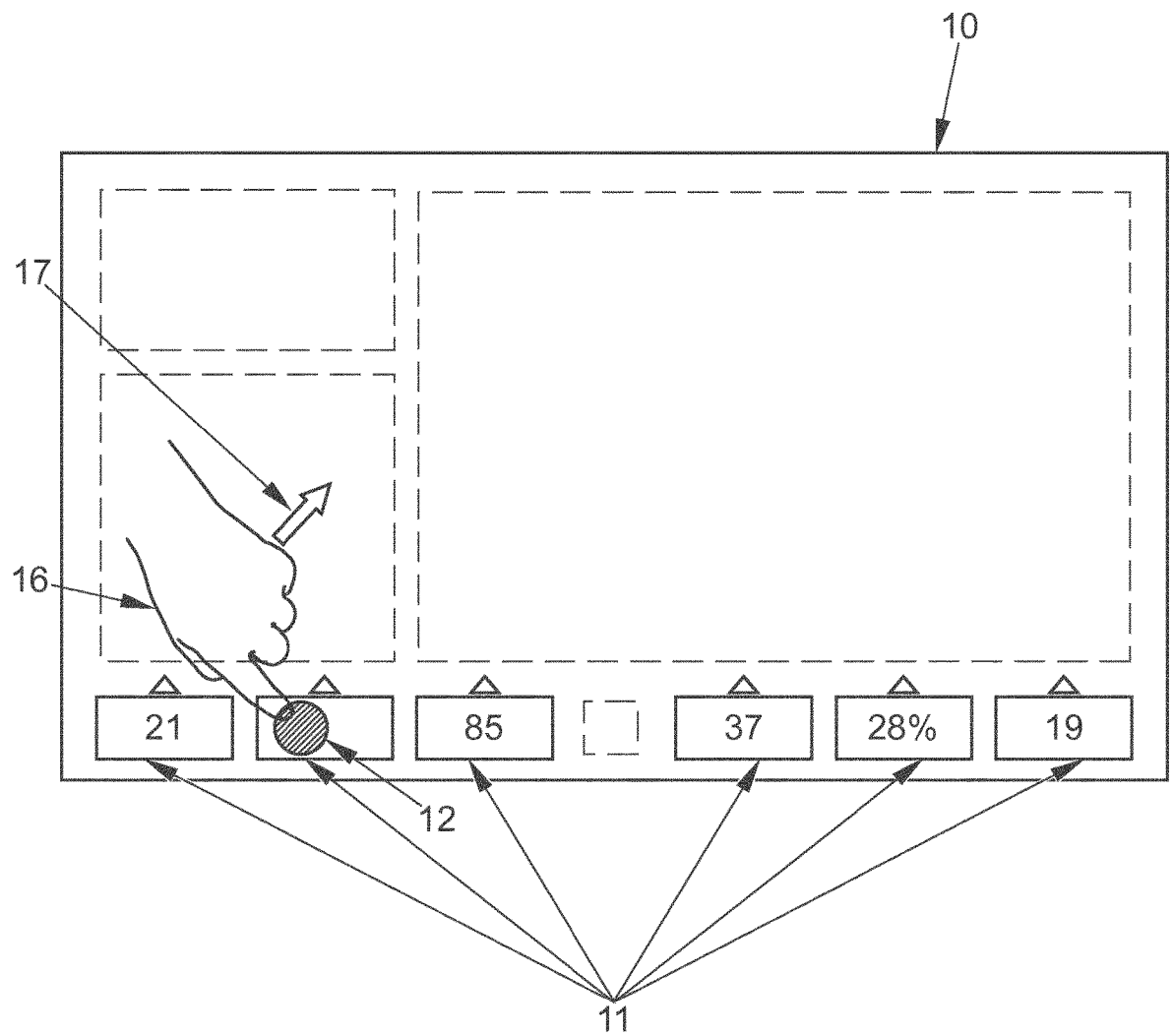

In the example of FIG. 2B, the drawing shows a user touching a touchscreen 5 with a finger 16 at the position corresponding to one of the selection objects 11 in the user interface. A control element 12 is shown at this position, forming a circular graphical element in this exemplary embodiment. The user subsequently moves the finger in the direction of the arrow 17, diagonally upward, without lifting the finger from the touchscreen.

In another example, the selection object 11 can be highlighted, for example, with a specific color.

Figure 2C:
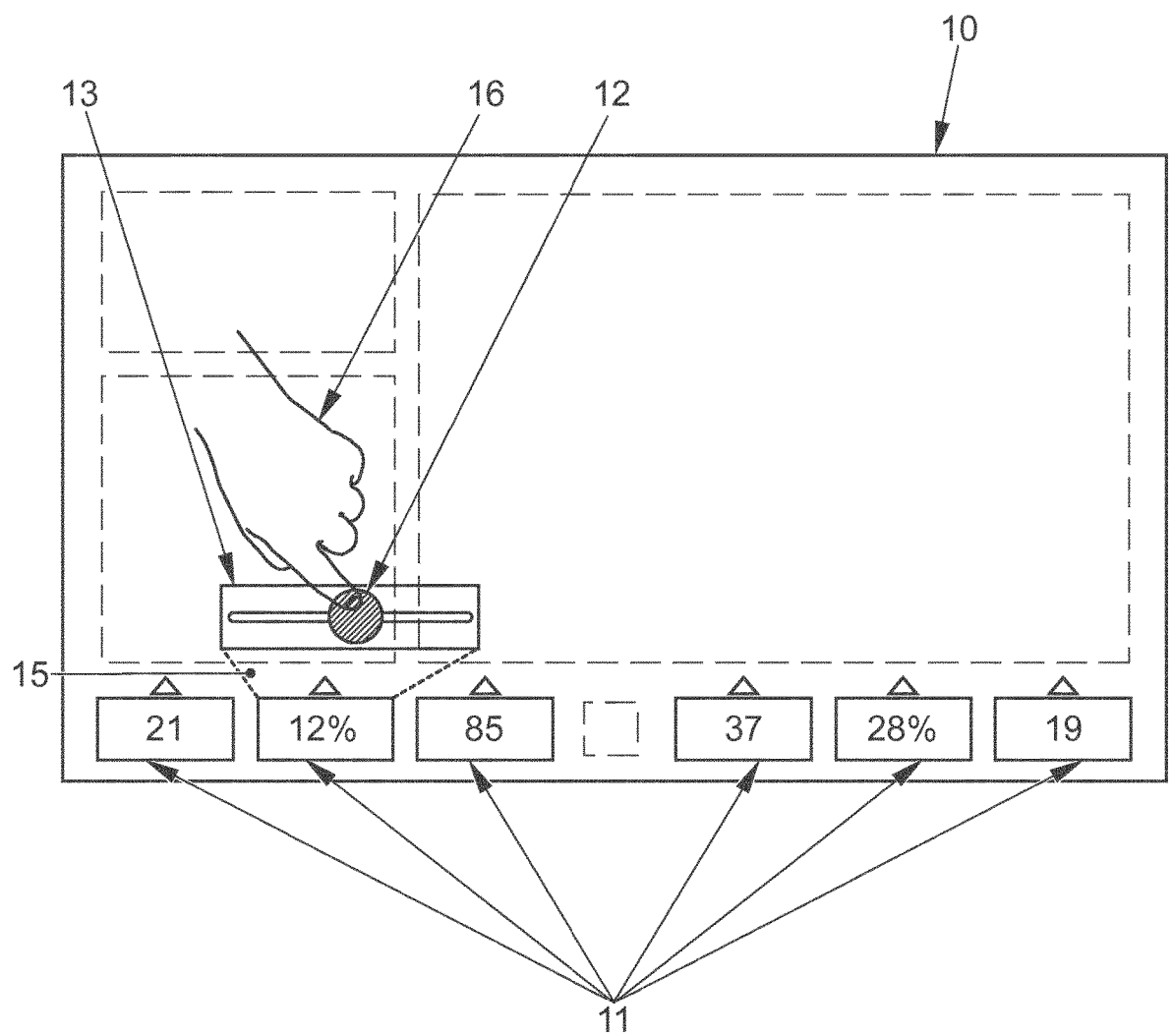

FIG. 2C shows an example in which the user has moved a finger 16 a short distance away from selection object 11. The control element 12 follows the movement of the finger 16 touching the display surface 10. A scale 13 may also be shown at this point. The element 12 and the scale 13 form a setting element that is now visible, after the scale 13, hidden by the control element 12 in FIG. 2B, is revealed. A highlighted region 15 is also shown that extends from the first selected selection object 11 to the scale 13. A "pulling up" of the scale 13 is animated while the finger 16 moves, where the scale 13 may increase in size, starting from the width of the selection object 11, as the finger 16 moves more vertically upward.

In this example, the scale 13 may be formed by a horizontal line. It also may be configured with a colored gradient, which illustrates an assignment of various values for a parameter to various positions along the scale 13. In other examples, the scale 13 can be wedge-shaped, for example, like the symbols used for audio volume control. Alternatively or additionally, a color-coded scale can be used to show the values of the parameters.

Figure 2D:
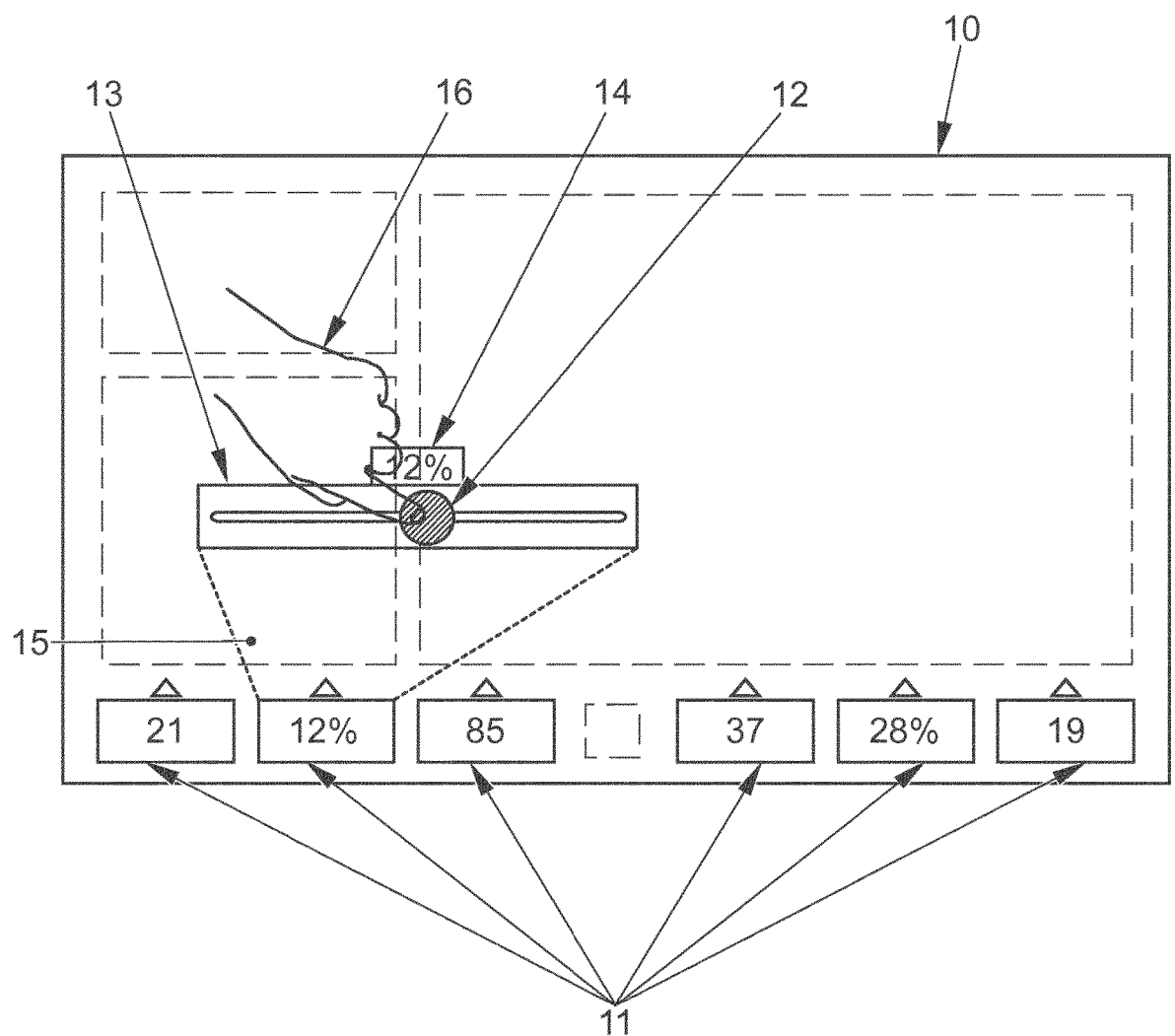

A further operating step is shown in FIG. 2D. Here, the user has moved a finger 16 slightly upward from the position shown in FIG. 2C, without lifting the finger from the display surface 10. The scale 13 is enlarged accordingly, and the highlighted area 15 increases in size from the selected selection object 11 to the scale 13.

In addition to the scale 13, an output 14 is then generated above the scale, which shows the alphanumeric value of the parameter assigned to the selection object 11. In another embodiment of the disclosure, this output 14 can be positioned, based on where the finger 16 is touching the display surface 10, such that it is not hidden by the finger 16, but instead is located to the side of where the finger touches the display surface.

In this example, the output 14 is first shown, in addition to the control element 12 and the scale, when the scale 13 has reached a certain size, or when it is at a certain distance to the selection objects 11. In other examples, the output 14 can be shown earlier or later.

The movement of the position where the finger 16 is touching the display surface is not exclusively vertical, and can also include horizontal components. In some examples, the scale 13 and the control element 12 are slid to the same extent, where the position of the control element 12 in relation to the scale does not change. Furthermore, the horizontal sliding does not result in an enlargement of the scale 13 in this example. In other examples, a horizontal movement in this phase results in a movement of the control element 12 in relation to the scale 13, and/or an enlargement of the scale 13 based on the distance to the selected selection element 11, in which the horizontal component of the distance is also taken into account.

Figure 2E:
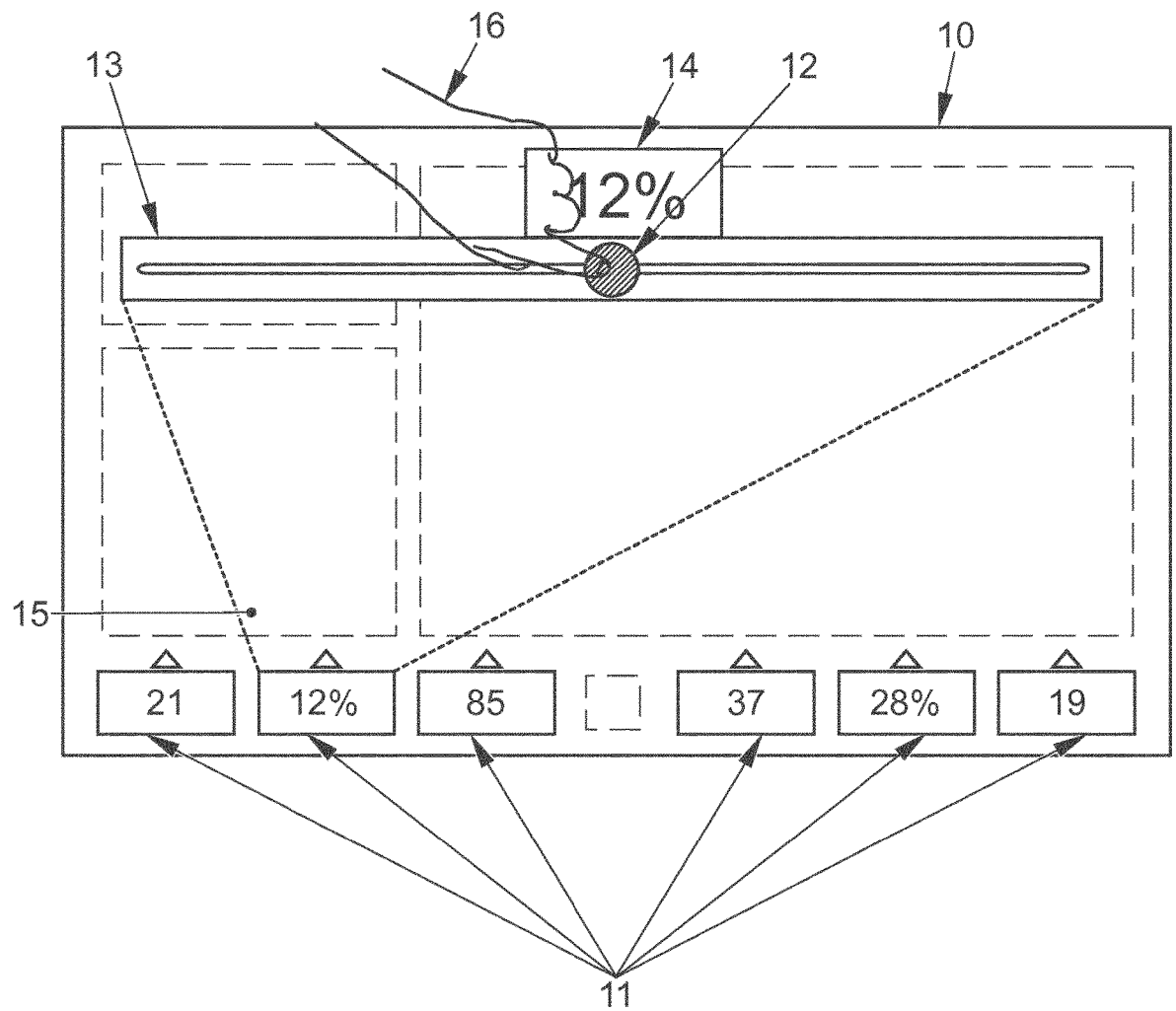

In the example of FIG. 2E, the setting element formed by the scale 13 and the control element 12 is slid further upward, such that the scale 13 extends over a larger portion of the width of the display surface 10. The alphanumeric output 14 is also enlarged accordingly. Up to this point in the course of operation, the user has positioned the setting object on the display surface 10, where a first user input is detected with a positioning gesture.

In some examples, the user may interrupt the sliding without lifting the finger 16 from the display surface 10. The length of time for which the touch remains substantially in position is detected, and the detected value is compared with a threshold value of, for example, 0.5 seconds. This threshold value may be longer or shorter. After determining that the movement has been interrupted for longer than the threshold value, a transition to a second user input is detected with a setting gesture.

Figure 2F:
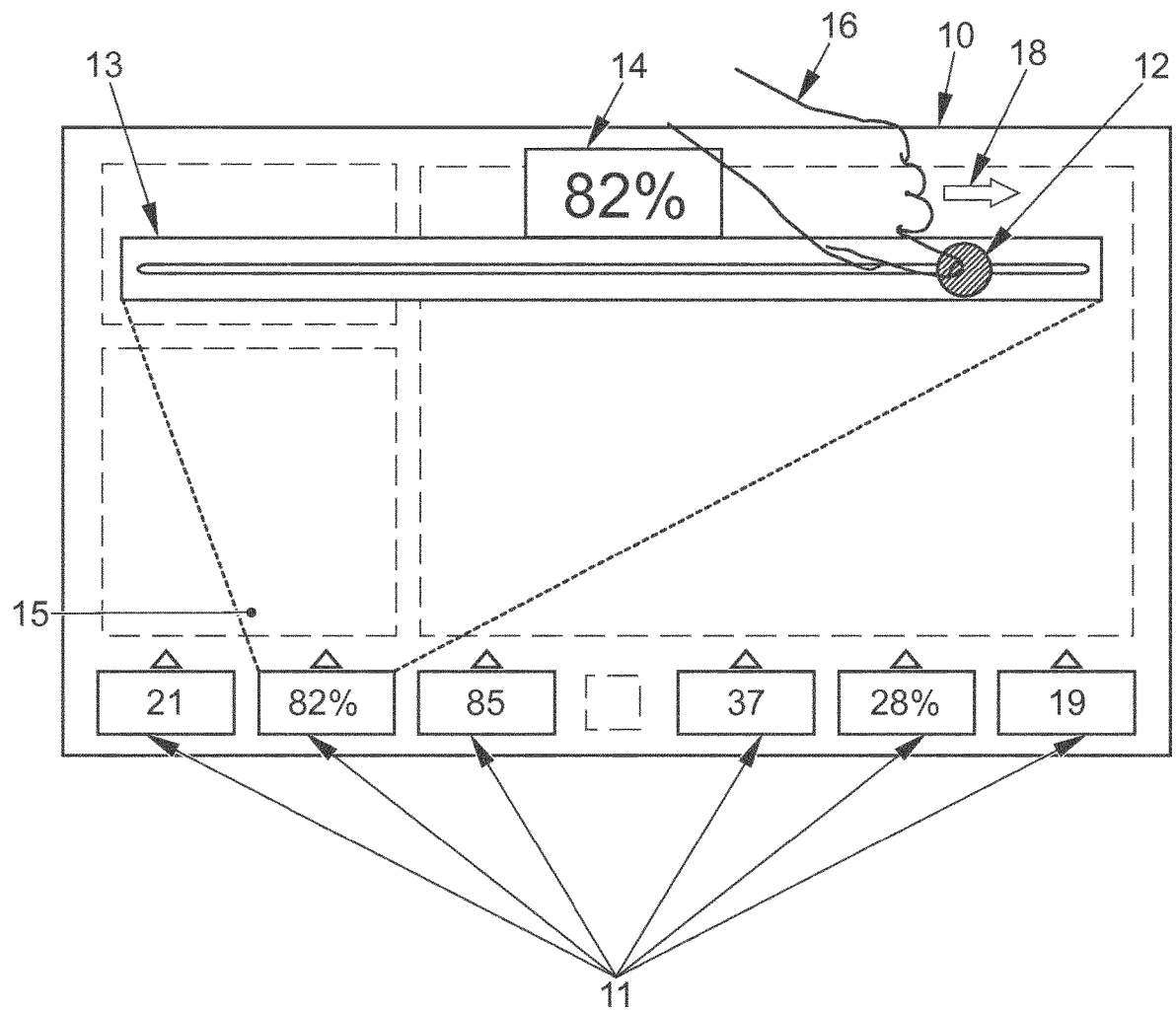

Further movements of the finger 16 along the display surface 10 are interpreted as setting gestures, and result, as shown in FIG. 2F, in a sliding of the control element 12 along the scale 13. This means that, when the finger 16 of the user moves in the direction indicated by the arrow 18, the control element 12 moves to the same extent, while the scale 13 remains in place. The value set for the parameter assigned to the selected selection object 11 changes based on the position of the control element 12 in relation to the scale 13. The corresponding value is displayed in the alphanumeric output 14 above the scale 13 and next to the selected selection object 11. Other examples may include a color coding, or some other indication in the display.

In some examples, the transition from the first user input with the positioning gesture to the second user input with the setting gesture is detected by other means. By way of example, a short lifting of the finger 16 from the display surface 10 in conjunction with a short subsequent resuming of the touch at substantially the same position is detected and interpreted as the transition. A change in the direction of movement of the finger 16 can also be detected, e.g., when the movement is first mainly vertical, and subsequently changes to a mainly horizontal direction. The direction of movement is detected, and its change over time is determined. Alternatively or additionally, there can be other events that indicate the transition from the first to the second user input, e.g. a voice input or some other input by the user.

Figure 2G:
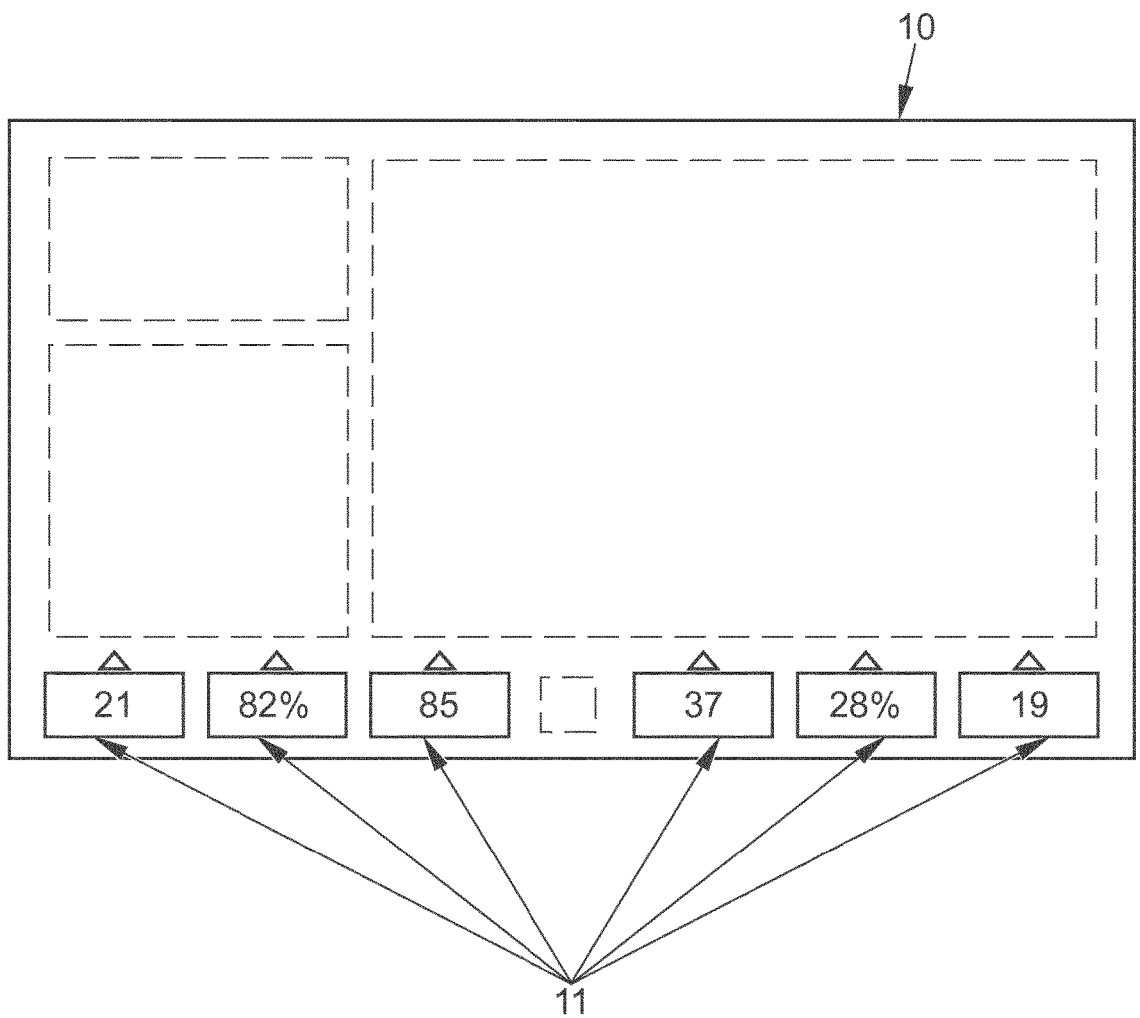

In the example of FIG. 2G, the user has lifted the finger 16 from the display surface 10. Here, the depictions of the highlighted region 15, the scale 13, the control element 12, and the alphanumerical output 14 disappear. The value that has been set in accordance with the position of the finger 16 at the end of the setting gesture, as shown in FIG. 2F, remains at the value shown in the display with the selection object 11.

In another example, the setting element can disappear in an animated sequence in which the setting element moves, e.g., toward the selected selection object 11, and shrinks before disappearing or fading out.

In other examples, the selection objects 11 are arranged along the side of the display surface 10, and the setting element comprising the scale 13 and the control element 12 are slid horizontally, away from the selection objects 11. The depiction is analogous to the examples described above. In particular, the enlargement is based on the horizontal distance from the setting element to the selection elements 11.

Here, the setting element formed by the scale 13 and the control element 12 is in the form of a horizontal slider. In other examples, the control element can be a vertical slider, or a slider in some other direction, or it can be a rotary button. Other embodiments of the setting element are also conceivable.

LIST OF REFERENCE SYMBOLS 1 vehicle
2 control unit
3 output unit
4 detection unit
5 touchscreen
10 display surface
11 selection object
12 control element
13 scale
14 output (alphanumerical)
15 highlighted region
16 finger
17 arrow, direction of movement
18 arrow, direction of movement

The invention claimed is:

1. A method for setting a value for a parameter in a vehicle control system, comprising:
   generating, via a control unit, a graphical user interface on a touchscreen, wherein the graphical user interface comprises a selection object assigned to the parameter;
   detecting, via a detection unit, a first user input comprising a positioning gesture relating to the selection object displayed on the graphical user interface;
   generating a control element for the selection object in the graphical user interface on the basis of an input location of the first user input;
   positioning, via the control unit, the control element on the graphical user interface on the basis of the positioning gesture relative to a plurality of positions of the positioning gesture across the graphical user interface;
   generating a setting object in the location of the control element on the graphical user interface, based on the plurality of positions and an end position of the positioning gesture, wherein generating the setting object comprises enlarging the setting object based on, or in proportion to, a length of a movement detected in the gesture during the detection of the positioning gesture;
   detecting, via the detection unit, a second user input comprising a setting gesture relative to the setting object; and setting, via the control unit, the value for the parameter of the setting object on the basis of the setting gesture.

2. The method according to claim 1, wherein the second user input is detected by the detection unit after the first user input.

3. The method according to claim 1, further comprising combining, via the control unit, the first and second user inputs from a movement, where
   (i) the start of the second user input is detected after the movement is interrupted, or
   (ii) the first and second user inputs form a movement is detected after a change in the direction of movement is detected.

4. The method according to claim 1, wherein detecting the positioning gesture comprises detecting a wiping gesture trajectory, and wherein detecting the setting gesture comprises detecting the setting gesture along the wiping gesture trajectory.

5. The method according to claim 1, wherein the setting object comprises a slider with a scale and a control element, wherein detecting the setting gesture comprises detecting sliding of the control element along the scale.

6. The method according to claim 1, wherein the value of the parameter that is set is displayed alphanumerically during the detecting of the setting gesture.

7. The method according to claim 1, wherein the setting object is slid upward on the user interface during the detection of the positioning gesture.

8. The method according to claim 1, further comprising detecting an end of the first and second user input, and facing the setting object in response thereto.

9. A system for setting a value for a parameter in a vehicle control system, comprising:
   a control unit, operatively coupled to a touchscreen, for generating a graphical user interface on the touchscreen, wherein the graphical user interface comprises a selection object assigned to the parameter;
   a detection unit, operatively coupled to the control unit and integrated in the touchscreen, wherein the control unit and detection unit are configured to detect a first user input comprising a positioning gesture relating to the selection object displayed on the graphical user interface;
   generate a control element for the selection object in the graphical user interface on the basis of an input location of the first user input;
   position the selection object on the graphical user interface on the basis of the positioning gesture relative to a plurality of positions of the positioning gesture across the graphical user interface;
   generate a setting object in the location of the control element on the graphical user interface, based on the relative positions and an end position of the positioning gesture wherein the setting object is configured to be enlarged based on, or in proportion to, a length of a movement detected in the gesture during the detection of the positioning gesture;
   detect a second user input comprising a setting gesture relative to the setting object; and
   set the value for the parameter of the setting object on the basis of the setting gesture.

10. The system according to claim 9, wherein the control unit and detection unit are configured to detect the second user input after the first user input.

11. The system according to claim 9, wherein the control unit and detection unit are configured to combine the first and second user inputs from a movement, and
    (i) detect the start of the second user input after the movement is interrupted, or (ii) combine the first and second user inputs after a change in the direction of movement is detected.

12. The system according to claim 9, wherein the control unit and detection unit are configured to detect the positioning gesture by detecting a wiping gesture trajectory, and wherein the control unit and detection unit are configured to detect the setting gesture by detecting the setting gesture along the wiping gesture trajectory.

13. The system according to claim 9, wherein the setting object comprises a slider with a scale and a control element, wherein detecting the setting gesture comprises detecting sliding of the control element along the scale.

14. The system according to claim 9, wherein the value of the parameter that is set is displayed alphanumerically during the detecting of the setting gesture.

15. The system according to claim 9, wherein the setting object is slid upward on the user interface during the detection of the positioning gesture by the detection unit.

16. The system according to claim 9, wherein the control unit and detection unit are configured to detect an end of the first and second user input, and facing the setting object in response thereto.

17. A method for setting a value for a parameter in a vehicle control system, comprising:
    generating, via a control unit, a graphical user interface on a touchscreen, wherein the graphical user interface comprises a selection object assigned to the parameter;
    detecting, via a detection unit, a first user input comprising a positioning gesture relating to the selection object displayed on the graphical user interface;
    generating a control element for the selection object in the graphical user interface on the basis of an input location of the first user input;
    positioning, via the control unit, the control element on the graphical user interface on the basis of the positioning gesture relative to a plurality of positions of the positioning gesture across the graphical user interface;
    generating a setting object in the location of the control element on the graphical user interface, based on the plurality of positions and an end position of the positioning gesture, wherein generating the setting object comprises enlarging the setting object based on, or in proportion to, a length of a movement detected in the gesture during the detection of the positioning gesture;
    detecting, via the detection unit, a second user input comprising a setting gesture;
    combining, via the control unit, the first and second user inputs from a movement, where (i) the start of the second user input is detected after the movement is interrupted, or (ii) the first and second user inputs form a movement is detected after a change in the direction of movement is detected; and
    setting, via the control unit, the value for the parameter of the setting object on the basis of the setting gesture.

\* \* \* \* \*